(12) United States Patent
Szymaszek et al.

(10) Patent No.: US 6,971,625 B2
(45) Date of Patent: Dec. 6, 2005

(54) PILOT OPERATED VALVE WITH VARIABLE PISTON ORIFICE

(75) Inventors: Paul G. Szymaszek, Waukesha, WI (US); Ricky J. VanSeters, Glen Ellyn, IL (US)

(73) Assignee: Parker Hannifin Corporation, Cleveland, OH (US)

( * ) Notice: Subject to any disclaimer, the term of this patent is extended or adjusted under 35 U.S.C. 154(b) by 96 days.

(21) Appl. No.: 10/676,757

(22) Filed: Oct. 1, 2003

(65) Prior Publication Data

US 2004/0084645 A1    May 6, 2004

Related U.S. Application Data

(60) Provisional application No. 60/424,120, filed on Nov. 5, 2002.

(51) Int. Cl.⁷ .......................................... F16K 31/122
(52) U.S. Cl. ........................... 251/28; 251/35; 251/38; 251/118
(58) Field of Search ............................. 251/25, 28, 35, 251/38, 118, 122, 325

(56) References Cited

U.S. PATENT DOCUMENTS

| | | | |
|---|---|---|---|
| 1,046,236 A | | 12/1912 | Wagner |
| 2,694,544 A | | 11/1954 | Hall |
| 3,020,925 A | | 2/1962 | Randall et al. |
| 3,114,532 A | * | 12/1963 | Gray et al. .................... 251/38 |
| 3,591,126 A | * | 7/1971 | Hauser ......................... 251/35 |
| 3,712,578 A | * | 1/1973 | Dawson ........................ 251/35 |
| 4,105,186 A | * | 8/1978 | Eby ............................ 251/35 |
| 4,493,473 A | * | 1/1985 | Rexer ........................... 251/35 |
| 4,895,342 A | * | 1/1990 | Feild .......................... 251/120 |
| 5,078,240 A | | 1/1992 | Ackermann et al. |
| 5,253,672 A | | 10/1993 | Uehara et al. |
| 5,738,332 A | * | 4/1998 | Perez Corbalan ........ 251/30.02 |
| 6,105,608 A | * | 8/2000 | Katzman ...................... 251/35 |

OTHER PUBLICATIONS

CDS Electric Evaporator Control Valves, Bulletin 100-40, May 2000.
Sealed Motor Valve, Bulletin R629a, Feb. 2002.
Electric Pilot Regulator Type A4AJ, Bulletin 23-12D, Feb. 2000.
Electrically Compensated Pressure Regulators, Bulletin 23-11, Jan. 1997.
Inlet Pressure Regulators, Bulletin 23-05, Feb. 1991.

* cited by examiner

*Primary Examiner*—John Bastianelli
(74) *Attorney, Agent, or Firm*—Daniel J. Whitman; Joseph J. Pophal

(57) ABSTRACT

A valve assembly having a valve body, a piston, a modulating plug, a valve cover adjoining the valve body, and a throttling member. The valve body has an inlet and outlet port, a partition with a valve seat separating the valve body into a first and second flow passage. The piston has a throughbore including an orifice, reciprocably mounted in the valve body and movable between a first and second position. The modulating plug, in abutting contact with the piston and reciprocably mounted in the valve body, gradually moves between an open position, permitting a main fluid flow, and a closed position engaging the valve seat, blocking the main fluid flow. The throttling member is adapted to insure a gradual alteration of the cross-section of the orifice upon piston movement. A method of gradually opening the valve assembly modulating plug is also set forth.

41 Claims, 4 Drawing Sheets

PILOT OPERATED VALVE WITH VARIABLE PISTON ORIFICE

CROSS-REFERENCE TO RELATED CASES

The present application claims the benefit of the filing date of U.S. Provisional Application Ser. No. 60/424,120 filed Nov. 5, 2002, the disclosure of which is incorporated herein by reference.

FIELD OF THE INVENTION

The present invention relates to a valve assembly with a variable piston orifice and the method of controlling the valve assembly's main stage position.

BACKGROUND OF THE INVENTION

In certain prior art constructions pertaining to pilot operated valves, such as U.S. Pat. No. 3,020,925 to Randall et al. and U.S. Pat. No. 6,105,608 to Katzman, conventional pressure regulating valves control pilot flow through the use of a diaphragm and spring arrangement. A range or pilot spring forces the diaphragm to cover an inlet passage, preventing pilot flow from traveling into a cavity above the piston. The set point of a valve is the pressure at which pilot flow lifts the diaphragm and causes the main stage to open. The range spring has to be manually adjusted so that the force needed to move the diaphragm is set at a predetermined level. Tightening an adjusting stem for the range spring increases the spring force acting on the diaphragm. As the spring force is increased, the diaphragm is held closed until the pilot flow reaches higher pressures. When the forces reach this limit, the diaphragm responds and allows fluid into a cavity above the piston. The fluid will cause the piston to move and opens the main stage, thus allowing the flow of fluid through main flow path. The advantage of this type of conventional regulating valve is that the pilot flow permitted through the seat will vary in proportion to the pressure force acting on the diaphragm. Higher pressure gives more pilot flow, resulting in more main stage movement. The disadvantages of this arrangement are that the valve must be manually adjusted, the valve will only respond to pressure signals, and the valve does not automatically change in response to or proportional to a significant change in pilot flow. Also, the pressures to which the diaphragm will respond are limited by the range spring characteristics.

A variation of the above-discussed conventional regulated valve is shown in a printed publication namely Refrigerating Specialties Bulletin 23-11 published in January 1997 by the Parker Hannifin Corporation, the assignee of the present invention. In this variation, the range spring can be adjusted by means of a cam rotated by an electric motor. This allows the set point of the valve to be adjusted remotely. Also, the valve set point can be controlled by parameters other than pressure, e.g. temperature. The disadvantage with this type of valve is that the motor is expensive and the mechanical parts will wear. Because of the wear, as well as normal variability in the parts, it is difficult to accurately set the pressure at which the valve will respond.

Another variation of the pressure-regulated valve shown in the above mentioned Bulletin 23-11 involves utilizing a proportional solenoid to meter the pilot flow. Thus the diaphragm and spring are eliminated. Instead, flow is metered by a solenoid plunger. As voltage to the solenoid coil is increased, the solenoid plunger moves to increase the pilot flow. The advantage of this type of valve is that the pilot flow can be directly controlled by a voltage signal. The control signal can respond to either pressure or temperature being sensed remotely. One disadvantage of this type of valve is that a solenoid generally has a significant amount of hysteresis. Since the pilot flow needed to slightly open the main stage is nearly the same as the pilot flow needed to hold the valve fully open, it is difficult to control the main stage to a position that is truly proportional to the input signal. Another example of a solenoid operated valve is shown in prior art reference U.S. Pat. No. 5,078,240 to Ackermann et al. Again, like the above reference solenoid metered valve, the disadvantage to this type of valve control is that the valve is either open or closed, and not modulated.

Another method of controlling the valve main stage involves directly coupling the modulating plug to an electric motor. These types of valve controls are set forth in a printed publication, namely Sporlan Bulletin 100-40, published in May, 2000 which details the use of a stepper motor for valve control manufactured by The Sporlan Valve Company Washington, Mo., and in a printed publication, namely Hansen Technologies Bulletin R629a, published in February, 2002, which details the use of a sealed motor for valve control manufactured by Hansen Technologies, Burr Ridge, Ill. The disadvantages of these constructions are that these motors are expensive and freeze in position in the event of a power failure. This can be a dangerous circumstance and requires costly and complex controls to overcome.

Prior art designs have used tapered pins to regulate the inlet to the piston chamber and to regulate the flow from the pressure chamber. Examples of these types of constructions are shown in U.S. Pat. No. 1,046,236 to Wagner and U.S. Pat. No. 2,694,544 to Hall, respectively. Although these constructions provide better control of the valve, they do not make the valve position automatically responsive to or proportional to a significant change in pilot flow.

Other prior art designed valves have a fixed orifice in the piston that allows a steady amount of fluid to pass once flow enters the gap or region above the piston. Such a construction is set forth in a printed publication entitled "Inlet Pressure Regulators" published in February, 1991 by the Refrigeration Specialties Division of the Parker Hannifin Corporation, the assignee of the present invention. With the fixed orifice, the main stage (or modulating plug) has a tendency to swing fully open due to the sudden change in pressure forces. This is due to the sudden decrease in force holding the modulating plug closed, while the forces acting in the opposite direction remain the same. If the device controlling the pilot flow continues to supply the same rate of flow, forces from the pilot flow will remain constant.

SUMMARY OF THE INVENTION

A feature of the present invention is to provide a valve assembly comprised of: a valve body with an inlet and an outlet port having a partition wall with a valve seat separating the valve body into a first flow passage and a second flow passage; a piston, with a throughbore including an orifice, reciprocally mounted in said valve body and movable between a first position and a second position; a modulating plug in abutting contact with the piston, reciprocally mounted in the valve body and gradually movable between an open position, which permits fluid flow from the first flow passage to the second flow passage, and a closed position engaging the valve seat, which blocks the fluid flow from the first flow passage to the second flow passage; a valve cover adjoining the valve body; and a throttling member, connected to the valve cover and extending into the throughbore and through the orifice, adapted to insure a gradual alteration of the cross-section of the piston orifice upon reciprocation of the piston between the first and second positions.

Another feature of the noted valve assembly includes having a throughbore in the valve cover for receiving a pilot fluid flow. Yet another feature of the noted valve assembly includes having a connecting passage in the valve body leading from the first flow passage to a gap between the valve body and the valve cover.

Another feature includes having the gradual alteration of the piston orifice cross-sectional area being proportional to the volume of the pilot flow passing through the piston orifice. A further feature includes having the gradual alteration of the piston orifice cross-sectional area change with the travel of the piston. An added feature includes having the piston orifice being fully closed when the piston is in the first position and being in its maximum open position when the piston is in the second position.

Still another feature in the noted valve assembly includes having the throttling member take the form of a tapered pin that is received within the piston throughbore. Further, the throttling member can have a cross-sectional area that gradually decreases from a first end to a second end. Yet further, the throttling member can be a fixed diameter disk that is received within the piston throughbore and the piston throughbore has a cross-section surface area that gradually increases from a first end to a second end.

Another feature of the present invention provides a method of gradually opening the modulating plug of the valve assembly. The valve assembly is similar to the noted valve assembly previously discussed, and the method includes the steps of: directing a flow of pilot fluid into an area between the valve cover and the valve body; increasing the pilot fluid forces on a first end of the piston, gradually moving the piston and the modulating plug, reciprocally mounted in the valve body, between a first position and a second position, wherein the first position includes having the throttling member sealingly closing the throughbore piston orifice; equalizing the forces acting upon the modulating plug; gradually increasing the pilot fluid flow forces acting upon the upper end of the modulating plug such that the modulating plug gradually moves to a fully opened position; and gradually opening the main fluid flow passage within the valve body. A further feature of the noted method has the step of gradually increasing the forces comprised of increasing the amount of fluid flow passing through the piston orifice. Still yet another feature of the noted method has the gradual movement of the modulating plug being proportional to the volume of the pilot fluid flow introduced to the valve assembly.

A further feature of the noted method has the gradual increase in pilot fluid forces acting upon the upper end of the modulating plug being a linear increase in fluid forces. Yet further, the fluid forces acting upon the upper end of the modulating plug can be a non-linear increase in fluid forces.

Yet another feature of the noted method has the equalization of the fluid forces acting upon the modulating plug occurring substantially simultaneously with the movement of the piston. And yet a further feature has the equalization of the fluid forces being reactive to an increase in the forces acting upon the piston. Further features and advantages of the present invention will become apparent to those skilled in the art upon review of the following specification in conjunction with the accompanying drawings.

DETAILED DESCRIPTION OF THE PREFERRED EMBODIMENT

Figure 1:
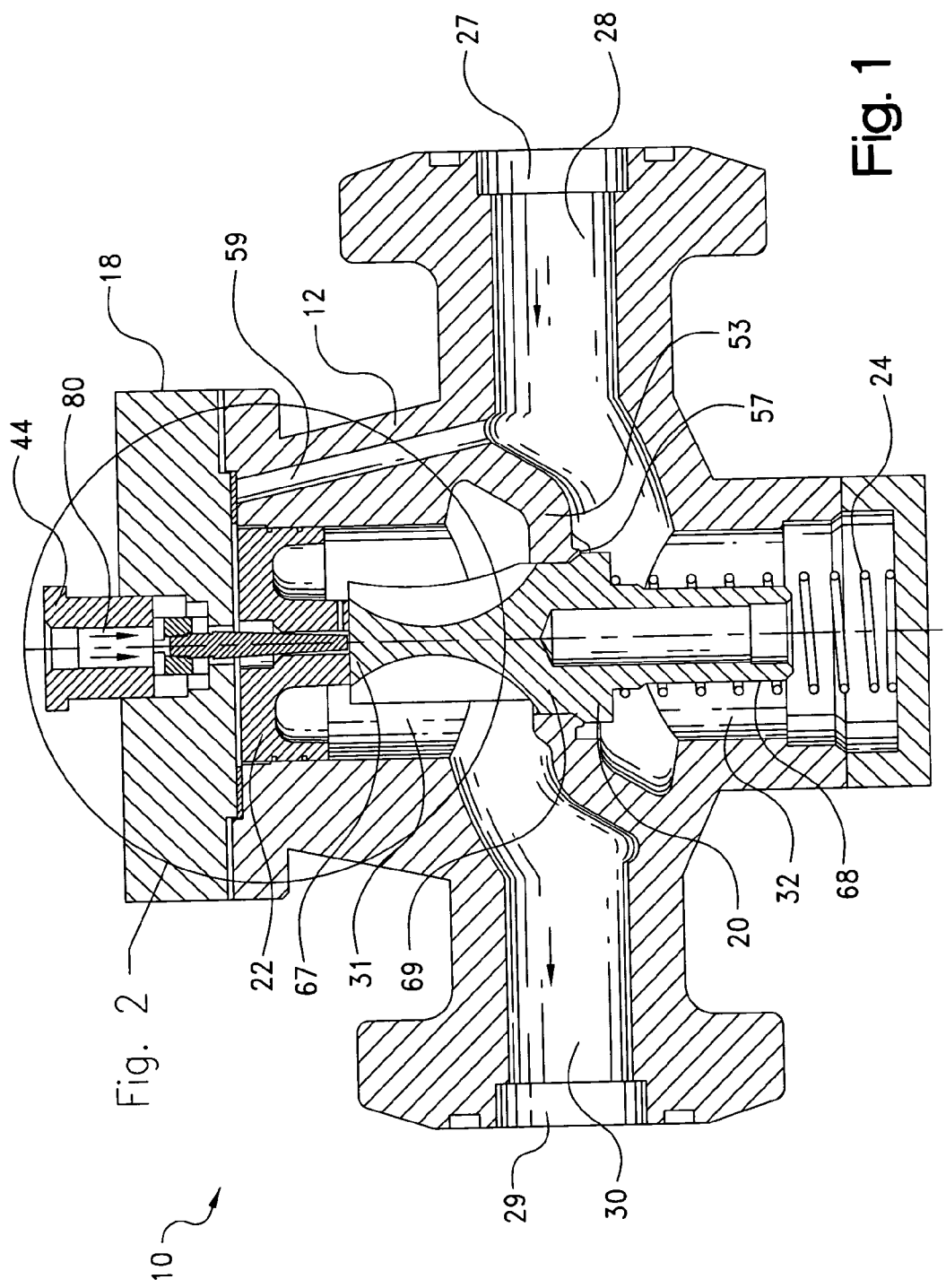
FIG. 1 is a cross-sectional view of a valve assembly according to the present invention.

Referring to the drawings, and particularly to FIG. 1, a pilot operated regulating valve assembly 10, according to the present invention, is shown. Among other uses, regulating valve 10 can be used to modulate the flow of common refrigerants and fluids approved for use in refrigeration systems in order to maintain constant upstream (or inlet) pressure during load fluctuations, for example.

Regulating valve assembly 10 is comprised of a valve body 12 having an inlet port 27 defined by a first main flow passage 28 and an outlet port 29 defined by a second main flow passage 30. Valve body 12 also has a first cylindrical cavity 31, located in its upper portion, and a second cavity 32, located in its lower portion. A narrow, generally cylindrical central passage 55, best seen in FIG. 3, fluidly connects first main flow passage 28 with second main flow passage 30. A central portion 53 of valve body 12 defines this central passage 55. Central portion 53, at the lower end of passage 55, is provided with an annular rim surface or knob-like surface 57 throughout the circumferential extent of central portion 53. Valve body 12 further has a narrow passage 59 which extends from first main flow passage 28 to the upper end of valve body 12.

Figure 2:
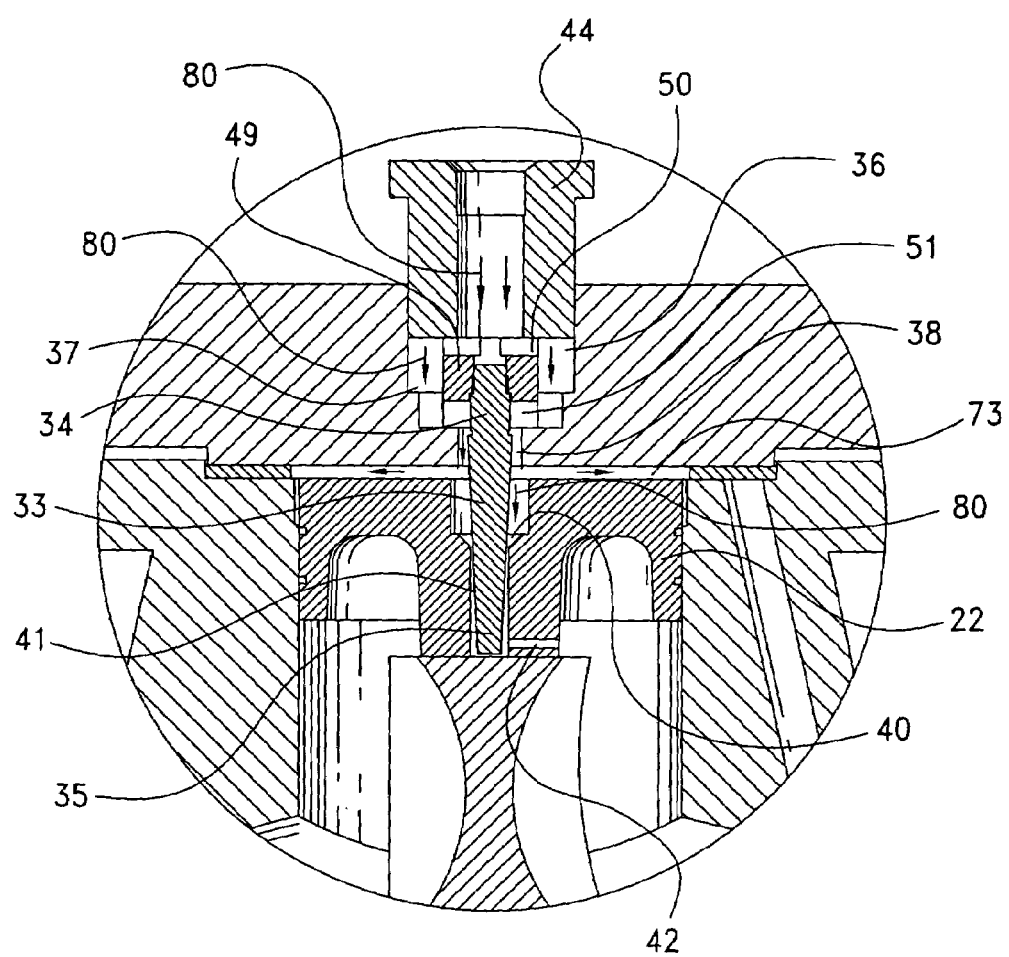
FIG. 2 is an enlarged cross-sectional view of the circled area, defined by line 2—2 in FIG. 1 showing a piston assembly in a closed position.

A valve cover 18, located on top of valve body 12, has a stepped through cylindrical passage 36, best seen in FIG. 2, for receiving a pilot fluid flow. Stepped passage 36 includes an upper, wider portion 37 which receives a locking nut 49, and a lower, narrow portion 38 which leads into a cylindrical gap 73 located between valve cover 18 and valve body 12.

A cylindrical piston 22 is received in and adapted for reciprocal movement within first cylindrical cavity 31 of valve body 12 and, at one end of its stroke, its upper surface is located adjacent to valve cover 18, with gap 73 separating this top surface therefrom. As best seen in FIG. 2, an upper portion 34 of a throttling member, such as, for example, a tapered pin 33, is retained within passage upper portion 37 in valve cover 18 by locking nut 49. A throttling member lower portion 35 is received within a stepped central bore, having a lower bore portion 41, in piston 22. An outer spacer 50 and inner spacer 51 are positioned on the upper and lower surfaces of nut 49, respectively. Outer spacer 50 can take the form of a compressed spring. Inner spacer 51 can take the form of nut 49, and has a lateral slot milled through its bottom portion to permit fluid flow. Valve cover passage lower portion 38 is larger than the diameter of throttling member 33, thus allowing throttling member 33 to find piston orifice 40. Due to the close fit between pin 33 and piston lower bore portion 41, if pin 33 is not fully aligned with piston bore portion 41, then piston 22 could be prevented from moving freely. To avoid any impeded movement of piston 22, pin 33 and attached nut 49 can move laterally (due to outer spacer spring 50) within lower bore portion 41 while allowing pilot fluid flow to pass therethrough. The axial extent of throttling member 33 can be adjusted via a threaded portion of throttling member upper portion 34 by nut 49, and pin 33 is thereafter locked into an axial position by means of upper and lower spacers 50, 51. A pilot fluid flow adapter 44, affixedly received within valve cover passage 36, functions as the inlet for pilot fluid flow.

Figure 3:
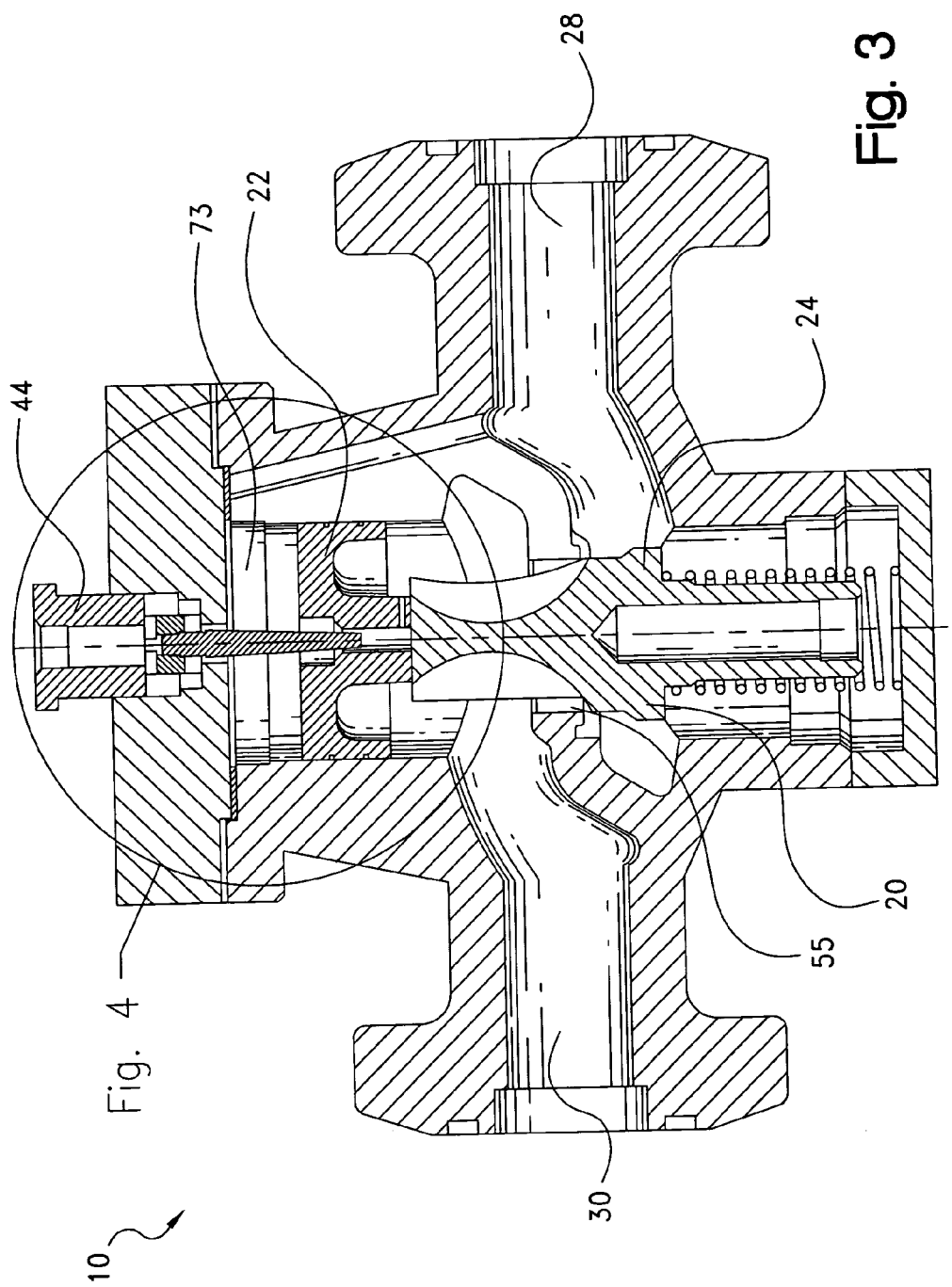
FIG. 3 is a further cross-sectional view of the valve assembly similar to that of FIG. 1, showing the piston assembly in an open position.

As best seen in FIGS. 1 and 3, a contoured modulating plug 20, having an upper sculpted portion 67 and a stepped cylindrical lower portion 68, is interposed between a lower surface of piston 22 and a closing spring 24. Modulating plug upper portion 67 is in abutting contact with piston 22 and is located substantially within valve body first cylindrical cavity 31. Modulating plug lower portion 68 is in biasing contact with closing spring 24 that is fixedly located within valve body second cavity 32. Modulating plug 20 includes a midportion 69 having a maximum outside diameter greater than the maximum lateral extent of modulating plug upper portion 67 and the diameter of plug lower portion 68. The maximum outside diameter of plug midportion 69 is greater than the inside diameter of annular rim surface 57 of valve body central portion 53.

The operation of the present invention will now be discussed. FIGS. 1 and 2 show a closed valve assembly 10 wherein modulated plug 20 is held in a closed position by closing or biasing spring 24. In this position the peripheral portion of modulating plug midportion 69 is biased into sealing contact with valve body annular rim surface 57. As a result, main fluid is unable to flow between first and second main flow passages, 28 and 30 respectively. This lack of main fluid flow increases the fluid pressure force in first main flow passage 28, acting on plug lower portion 68, thereby holding modulating plug 20 in a closed position.

A pilot fluid flow, represented by arrows 80, is introduced into valve assembly 10 through adapter 44, and flows into valve cover passage 36. It should be noted that pilot fluid flow 80 could, alternatively, be introduced into cylindrical gap 73 through an unimpeded passage 59, being fed from first main flow passage 28, if so desired. Pilot fluid flow 80 from adapter 44, via passages 36 and 38, fills cylindrical gap 73 and exerts and builds up pressure on the top surface of piston 22. Since a minimal amount of pilot fluid flow 80 will leak around pin 33 while in its substantially closed position, as well as around the periphery of piston 22, pressure will not build in gap 73 until the pilot fluid flow exceeds this leakage. It should be noted that unlike prior art designs in which pilot flow can travel through the piston via a fixed orifice hole extending through the piston, pilot fluid flow 80 is trapped in gap 73 (with the exception of the noted leakages) while piston 22 remains in the closed position shown in FIGS. 1 and 2. When the pressure within gap 73 becomes sufficient to overcome the forces (i.e. the opposing biasing force exerted by closing spring 24 and pressure in flow passage 28) holding modulating plug 20 closed, piston 22 together with modulating plug 20 are forced inwardly (into the position shown in FIGS. 3 and 4), thereby allowing main fluid to flow from first flow passage 28 into second flow passage 30. Pilot fluid flow 80 then flows through a side passage 42 in piston 22 and joins the main fluid.

Piston orifice 40 is substantially closed by throttling member 33 when piston 22 is in its outermost stroke position, shown in FIGS. 1 and 2, and valve assembly 10 is in a closed position. In the prior art, the piston orifice area is both small and fixed, so the pilot fluid flow required to initially move the piston (and modulating plug) is nearly the same as the flow needed to hold the piston (and modulating plug) in a fully open position. In the present invention, the opening (the annular area between orifice diameter 40 and throttling member 33 outer diameter) within piston 22 increases as piston 22 travels inwardly. Since throttling member 33 is tapered, such that its cross section is smaller at lower portion 35 than at upper portion 34, the increase in the annular area between orifice 40 and tapered throttling member 33 allows more pilot flow 80 to pass therethrough as piston 22 travels inwardly relative to throttling member 33. As the opening becomes greater when piston 22 moves inwardly, more pilot fluid is needed to continue to force piston 22 inwardly since more fluid is allowed to pass through the increasing annular orifice opening. This effectively increases the difference between the pilot fluid flow needed to just barely open modulating plug 20 and the pilot fluid flow needed to fully open modulated plug 20.

Throttling member 33 can readily take the form of other design variations in addition to that of the previously-described tapered pin and continue to function as long as the cross-sectional area between throttling member 33 and orifice 40 gradually increases as piston 22 travels inwardly. For example, throttling member 33 can have a constant outer diameter with longitudinal slits that increases in area closer to lower portion 35. In another embodiment, throttling member 33 can be of constant diameter, while the diameter of piston bore 41 increases during inward movement of piston 22.

Figure 4:
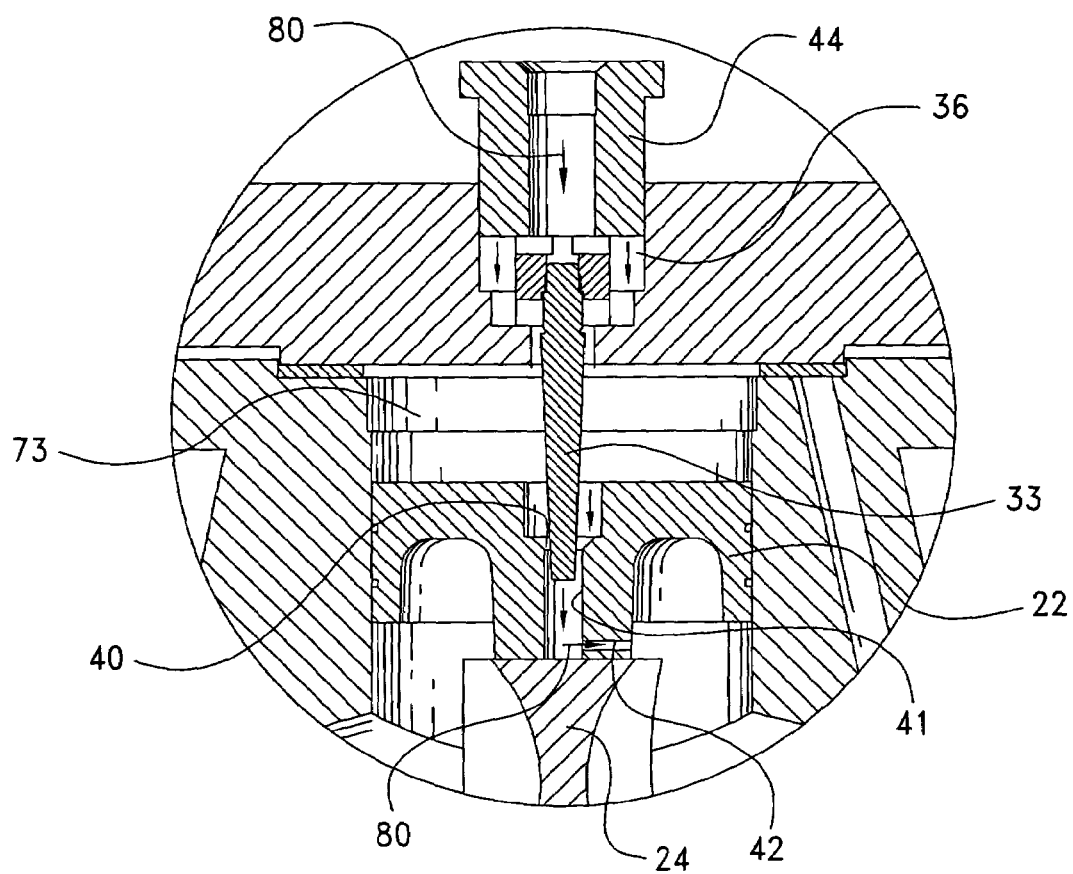
FIG. 4 is an enlarged cross-sectional view of the circled area, defined by line 4—4 in FIG. 3, showing the piston assembly in an open position.

The present invention also addresses the fluctuating pressures within valve assembly 10 as modulating plug 20 begins to move. Referring specifically to FIGS. 3 and 4, as soon as modulating plug 20 begins to move slightly inwardly, the fluid pressure in first main flow passage 28 is suddenly reduced. Therefore, the fluid pressure force acting to hold modulating plug 20 closed suddenly decreases, which typically (in prior art designs) causes modulating plug 20 to suddenly move to a fully open position. However, in the present invention, the fluid pressure forces acting on the top surface of piston 22 also decrease with the inward movement of modulating plug 20. The fluid pressure forces within gap 73 decrease since fluid is allowed to flow through the gradually enlarging cross-sectional opening of piston orifice 40. If the pilot fluid flow rate remains constant, forces from pilot fluid flow 80 decrease as the cross-section of piston orifice 40 increases. As soon as the piston orifice cross-section increases, a new equilibrium is established and piston 22 is prevented from moving further downward until pilot fluid flow 80 increases, thus providing additional force to move piston 22 inwardly. Valve assembly 10 reacts to changing pressure requirements the instant that modulating plug 20 moves off valve body annular rim surface 57. As the pilot device increases the fluid flow, forces from the fluid flow will cause piston 22 to move further inwardly, thus gradually increasing the cross-section of piston orifice 40. This continues until the pilot device allows the maximum amount of flow, when piston 22 is at its maximum inward stroke position (as shown in FIGS. 3 and 4), and modulating plug 20 is in its fully open position. For each position of the pilot fluid flow device, there is only one corresponding position of modulating plug 20.

It should be noted that the present invention is not limited to the specified preferred embodiments and principles. Those skilled in the art to which this invention pertains may formulate modifications and alterations to the present invention. These changes which rely upon the teachings by which this disclosure has advanced are properly considered within the scope of this invention as defined by the appended claims.

What is claimed is:

1. A valve assembly comprising a valve body with an inlet and an outlet port, a partition wall having a valve seat separating said valve body into a first flow passage and a second flow passage; a piston, having a throughbore including an orifice, reciprocably mounted in said valve body, said piston being gradually movable between a first position and a second position; a modulating plug in conjoining contact with said piston, reciprocably mounted in said valve body and gradually movable between an open position, permitting fluid flow from said first flow passage to said second flow passage, and a closed position engaging said valve seat, blocking fluid flow from said first flow passage to said second flow passage; a valve cover adjoining said valve body; and a throttling member connected with said valve cover and extending into said througlibore and substantially closing said orifice, adapted to insure a gradual alteration of the cross-sectional area of said orifice upon reciprocation of said piston between said first and second positions.

2. The valve assembly as in claim 1 wherein said valve cover has a throughbore, for receiving a pilot fluid flow, aligned with said piston throughbore.

3. The valve assembly as in claim 1 wherein said valve body has a connecting passage leading from said first flow passage to a gap between said valve body and said valve cover.

4. The valve assembly as in claim 1 wherein said gradual alteration of the cross-sectional area of said piston orifice is proportional to the volume of a pilot fluid flow passing through said orifice in said piston.

5. The valve assembly as in claim 1 wherein said gradual alteration of the cross-sectional area of said piston orifice is accompanied by a gradual movement of said modulating plug between said opening position and said closed position.

6. The valve assembly as in claim 1 wherein the cross-sectional area of said piston orifice changes for each position of said piston between said first and second positions.

7. The valve assembly as in claim 1 wherein the permissible volume of a pilot fluid flow changes with each position of said piston between said first and second positions.

8. The valve assembly as in claim 1 wherein at said piston first position, said piston orifice is substantially fully closed, and in said second position said piston orifice is in its maximum open position.

9. The valve assembly as in claim 2 wherein said valve cover throughbore includes a passage for directing pilot fluid flow into said piston throughbore.

10. The valve assembly as in claim 1 wherein said throttling member is a tapered pin which is received within said piston throughbore.

11. The valve assembly as in claim 1 wherein said throttling member is a pin having a cross-sectional area that gradually decreases from its top to its bottom.

12. The valve assembly as in claim 1 wherein said throttling member has a constant diameter of a predetermined size which is received within said piston throughbore and said piston throughbore has a cross-sectional area that gradually increases from a first end to a second end.

13. A valve assembly comprising:
a valve body with an inlet and an outlet port having a partition wall with a valve seat separating said valve body into a first flow passage and a second flow passage;
a piston, having a throughbore including an orifice, reciprocably mounted in said valve body and movable between a first position and a second position;
a modulating plug in abutting contact with said piston, reciprocably mounted in said valve body and gradually movable between an open position, permitting fluid flow from said first flow passage to said second flow passage, and a closed position engaging said valve seat, blocking fluid flow from said first flow passage to said second flow passage;
a valve cover adjoining said valve body; and
a throttling member, connected to said valve cover and extending into said throughbore and through and substantially closing said orifice, adapted to insure a gradual alteration of the cross-section of said piston orifice upon reciprocation of said piston between said first and second positions.

14. The valve assembly as in claim 13 wherein said valve cover has a throughbore, for receiving a pilot fluid flow, aligned with said piston throughbore.

15. The valve assembly as in claim 13 wherein said valve body has a connecting passage leading from said first flow passage to a gap between said valve body and said valve cover.

16. The valve assembly as in claim 13 wherein said gradual alteration of the cross-section of said piston orifice provides a gradual movement of said modulating plug between said opening position and said closed position.

17. The valve assembly as in claim 13 wherein the cross-section of said piston orifice changes for each position of said piston between said first and said second position.

18. The valve assembly as in claim 13 wherein the permissible volume of a pilot fluid flow changes with each position of said piston between said first and said second position.

19. The valve assembly as in claim 13 wherein said throttling member is a tapered pin which is received within said piston throughbore.

20. The valve assembly as in claim 13 wherein said gradual alteration of the cross-sectional area of said piston orifice is proportional to the volume of said pilot flow passing through said piston orifice.

21. The valve assembly as in claim 13 wherein said gradual alteration of the cross-sectional area of said piston orifice changes with the travel of said piston.

22. The valve assembly as in claim 13 wherein said gradual alteration of the cross-sectional area of said piston is linear.

23. The valve assembly as in claim 13 wherein said gradual alteration of the cross-sectional area of said piston is non-linear.

24. The valve assembly as in claim 13 wherein at said piston first position, said piston orifice is substantially filly closed and in said second position said piston orifice is in its maximum open position.

25. The valve assembly as in claim 13 wherein said throttling member has a cross-sectional area that gradually decreases from a first end to a second end.

26. The valve assembly as in claim 13 wherein said throttling member has a constant diameter of a predetermined size which is received within said piston throughbore and said piston throughbore has a cross-sectional area that gradually increases from a first end to a second end.

27. A method of gradually opening a modulating plug of a valve assembly, said valve assembly including a valve body having a main fluid flow passage extending therethrough, a valve cover, a throttling member connected to said valve cover, a reciprocable piston having a throughbore including an orifice, which receives said throttling member therethrough, said modulating plug having an upper end in abutting contact with said piston, said method comprising the steps of:
  a. directing a flow of pilot fluid into a restricted gap adjoining an outer end of said piston;
  b. increasing said pilot fluid forces on a first end of said piston, gradually moving said piston and said modulating plug, reciprocably mounted in said valve body, between a first position and a second position, wherein said first position includes having said throttling member substantially closing said throughbore piston orifice;
  c. equalizing the forces acting upon said modulating plug;
  d. gradually increasing the pilot fluid flow forces indirectly acting upon the upper end of said modulating plug such that said modulating plug gradually moves to a fully opened position; and
  e. gradually opening said main fluid flow passage within said valve body.

28. The method as in claim 27 wherein the step of gradually increasing the forces comprises increasing the amount of fluid flow passing through said piston orifice.

29. The method as in claim 27 wherein said modulating plug gradual movement is proportional to the volume of pilot fluid flow introduced to said valve assembly.

30. The method as in claim 27 wherein said gradual increase in pilot fluid forces indirectly acting upon the upper end of said modulating plug is a linear increase.

31. The method as in claim 27 wherein said equalization of fluid forces indirectly acting upon said modulating plug occurs substantially simultaneously with movement of said piston.

32. The method as in claim 27 wherein said equalization of fluid forces indirectly acting upon said modulating plug is reactive to an increase in forces acting upon said piston.

33. The method as in claim 27 wherein said gradual increase in pilot fluid force indirectly acting upon the upper end of said modulating plug is a non-linear increase.

34. A valve assembly comprising:
  a valve body with an inlet and an outlet port having a partition wall with a valve seat separating said valve body into a first flow passage and a second flow passage;
  a piston having a throughbore including an orifice, reciprocably mounted in said valve body and movable between a first position and a second position;
  a modulating plug in abutting contact with said piston, reciprocably mounted in said valve body and movable between an open position, permitting fluid flow from said first flow passage to said second flow passage, and a closed position engaging said valve seat, blocking fluid flow from said first flow passage to said second flow passage;
  a valve cover adjoining said valve body; and
  a throttling member, connected to said valve cover, adapted to insure one of a linear and non-linear altering of said piston orifice cross-sectional area upon movement of said piston wherein said throttle substantailly closes said orifice.

35. The valve assembly as in claim 34 wherein said valve cover has a throughbore, for receiving a pilot fluid flow, aligned with said piston throughbore.

36. The valve assembly as in claim 34 wherein said valve body has a connecting passage leading from said first flow passage to a restricted gap adjoining an outer end of said piston.

37. The valve assembly as in claim 34 wherein said throttling member is a pin, having various cross-sections that are separated with a plurality of steps, received by said piston throughbore.

38. The valve assembly as in claim 34 wherein said altering of the opening of said piston orifice cross-sectional area is substantially reactive to the volume of said pilot flow passing through said piston orifice.

39. The valve assembly as in claim 34 wherein in said piston first position, said piston orifice is substantially closed and in said second position said piston orifice is in its furthermost open position.

40. The valve assembly as in claim 34 wherein said modulating plug movement from said closed position to said open position is non-linear.

41. The valve assembly as in claim 34 wherein said modulating plug movement from said closed position to said open position is linear.

* * * * *